(12) United States Patent
Larson

(10) Patent No.: US 7,374,579 B2
(45) Date of Patent: May 20, 2008

(54) SYSTEM FOR EXTRUDING, CUTTING IN STRANDS, FREEZING, AND CHOPPING A GROUND FOOD PRODUCT AND METHOD THEREOF

(75) Inventor: Edward Alan Larson, Versalles, OH (US)

(73) Assignee: Cargill, Incorporated, Wayzata, MN (US)

( * ) Notice: Subject to any disclaimer, the term of this patent is extended or adjusted under 35 U.S.C. 154(b) by 862 days.

(21) Appl. No.: 10/920,847

(22) Filed: Aug. 18, 2004

(65) Prior Publication Data

US 2006/0040028 A1    Feb. 23, 2006

(51) Int. Cl.
*F25D 13/06* (2006.01)
(52) U.S. Cl. .............. 426/62; 62/374; 62/380; 83/198; 425/289; 99/517
(58) Field of Classification Search .......... 62/63, 62/186, 266, 374, 380, 345, 177, 178, 179, 62/180; 198/461.3, 855, 572; 426/516, 426/518, 524; 99/510, 517, 537; 425/315, 425/316, 289; 264/28, 148; 83/198
See application file for complete search history.

(56) References Cited

U.S. PATENT DOCUMENTS

| | | | |
|---|---|---|---|
| 3,892,104 A | 7/1975 | Klee et al. | |
| 4,033,142 A | 7/1977 | Schorsch et al. | |
| 4,086,783 A | 5/1978 | Wagner et al. | |
| 4,142,376 A | 3/1979 | Sandberg | |
| 4,184,423 A * | 1/1980 | Raque et al. | 99/537 |
| 4,276,753 A | 7/1981 | Sandberg et al. | |
| 4,350,027 A * | 9/1982 | Tyree, Jr. | 62/374 |
| 4,627,244 A | 12/1986 | Willhoft | |
| 4,745,762 A | 5/1988 | Taylor | |
| 4,783,972 A * | 11/1988 | Tyree et al. | 62/374 |
| 4,800,728 A | 1/1989 | Klee | |
| 4,947,654 A | 8/1990 | Sink et al. | |
| 4,966,003 A | 10/1990 | Shima | |
| 5,123,261 A * | 6/1992 | Cope | 62/374 |
| 5,444,985 A * | 8/1995 | Lang et al. | 62/63 |
| 5,467,612 A | 11/1995 | Venetucci | |
| 5,611,213 A * | 3/1997 | Rasovich | 62/374 |
| 5,773,070 A * | 6/1998 | Kazemzadeh | 426/573 |
| 5,861,117 A * | 1/1999 | Rosenbaum | 264/37.1 |
| 6,167,709 B1 * | 1/2001 | Caracciolo et al. | 62/64 |
| 6,244,146 B1 * | 6/2001 | Arthur et al. | 83/23 |
| 6,290,483 B1 * | 9/2001 | McIsaac et al. | 425/192 R |
| 6,485,770 B2 * | 11/2002 | McIsaac et al. | 426/512 |
| 6,497,106 B2 | 12/2002 | Lang et al. | |
| 6,725,686 B2 * | 4/2004 | Miller | 62/374 |

* cited by examiner

*Primary Examiner*—Mohammad M Ali

(57) ABSTRACT

Disclosed are a method and a system for extruding, cut into strands, cooling, and chopping a ground food product. The system comprises a cooling unit, a conveyor belt urging the pieces through the unit, and a chopper for cutting the pieces exiting the unit. A cryogen source provides cryogen to the cooling unit. A feeder feeds the ground food product onto the conveyor belt adjacent an inlet of the unit. The feeder also extrudes the ground food product through a nozzle to place the stranded pieces onto the conveyor belt. A shear plate cuts the stranded pieces, while being extruded. A hydraulic system moves the shearing plate. The system is adapted to dispense cryogen to the cooling region at a rate sufficient to lower the temperature of the cut stranded pieces to a desired temperature when they exit the unit. A chopper cuts the extruded and stranded pieces immediately after freezing.

20 Claims, 3 Drawing Sheets

SYSTEM FOR EXTRUDING, CUTTING IN STRANDS, FREEZING, AND CHOPPING A GROUND FOOD PRODUCT AND METHOD THEREOF

FIELD OF THE INVENTION

The present invention relates to a system and method for extruding, cutting into strands, freezing, and chopping a ground food product.

BACKGROUND OF THE INVENTION

In the food processing industry, there are points in a food's production—from its raw state through processing and shipping to consumption by the consumer—at which potential hazards can be controlled or eliminated. Examples are cooking, cooling, packaging, and metal detection. For raw ground pieces of a food product (i.e., fruits, vegetables, and meats such as beef, poultry, and fish) being processed, it is often desirable that such raw food products be maintained at a temperature within a few degrees of freezing. Doing so retards the ability of microorganisms and other adverse agents to grow on or in the ground food products.

While some techniques have been disclosed in the prior art to provide efficient and rapid processes for freezing ground food products, they have yet to achieve an optimum combination of a rapid rate of temperature reduction, and a rapid rate of throughput in the production of extruded, stranded, frozen, and chopped ground food product. The invention described herein achieves these objectives and others which will be disclosed in the description.

BRIEF SUMMARY OF THE INVENTION

One aspect of the present invention is a system for extruding, cutting into strands, freezing, and chopping a ground food product. The system comprises a cooling unit comprising an enclosure and having an inlet and an outlet, a conveyor belt for continuously urging extruded and stranded pieces of the ground food product from the inlet through a cooling region in the enclosure and out of the outlet when the conveyor belt is rotating, and a cryogen source for feeding cryogen into the cooling region, wherein the cryogen source is adapted to dispense the cryogen at a flow rate sufficient to lower the temperature of the extruded and stranded pieces to a desired temperature at or below freezing when they exit the outlet of the enclosure. The system also includes a feeder for receiving and feeding continuously the ground food product onto the conveyor belt adjacent the inlet of the enclosure, the feeder having a hopper for holding a supply of the ground food product and a nozzle having a plurality of holes through which the ground food product is extruded onto the conveyor belt, and a shearing plate provided to cut extruded pieces of the ground food product, while being extruded, into strands. The system further includes an actuator system for moving the shearing plate in order to cut the extruded pieces of the ground food product, and a chopper provided adjacent the outlet of the enclosure and feed by the conveyor belt for chopping the extruded and stranded pieces of the food product after passing through the cooling zone of the enclosure into smaller pieces.

Another aspect of the present invention is a continuous method for extruding, cutting into strands, freezing, and chopping a ground food product. The method comprises providing a cooling unit comprising an enclosure and having an inlet and an outlet, a conveyor belt continuously urging extruded and stranded pieces of the ground food product from the inlet through a cooling region in the enclosure and out of the outlet, and a cryogen source feeding cryogen into the cooling region, wherein the cryogen source is dispensing the cryogen at a flow rate sufficient to lower the temperature of the extruded and stranded pieces to a desired temperature at or below freezing when exiting the outlet of the enclosure. The method also includes providing a feeder receiving and feeding continuously the ground food product onto the conveyor belt adjacent the inlet of the enclosure, the feeder having a hopper holding a supply of the ground food product and a nozzle having a plurality of holes through which the ground food product is extruded onto the conveyor belt, and a shearing plate provided to cut extruded pieces of the ground food product, while being extruded, into strands. The further includes providing an actuator system moving the shearing plate in order to cut the extruded pieces of the ground food product; and providing a chopper provided adjacent the outlet of the enclosure and feed by the conveyor belt chopping the extruded and stranded pieces of the food product after passing through the cooling zone of the enclosure into smaller pieces.

These and other features and objects of the present invention will be apparent in light of the description of the invention embodied herein.

DETAILED DESCRIPTION OF THE INVENTION

Products that can be treated in accordance with the present invention include ground beef, ground chicken, ground turkey and other ground meats and poultry, as well as fruits, vegetables, and pastry products.

Figure 1:
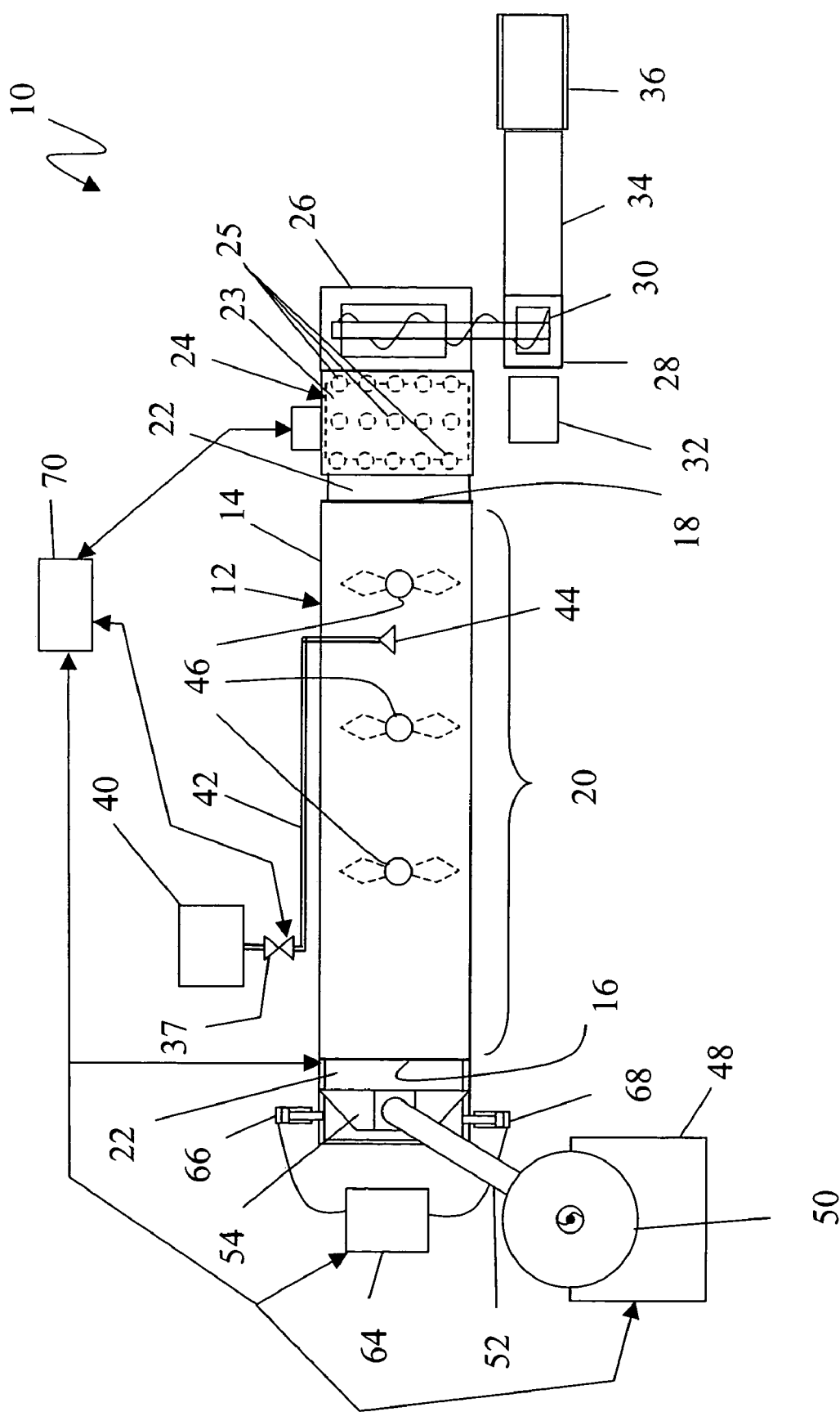
FIG. 1 is a schematic view of a system useful in practicing the present invention.

Referring to FIG. 1, a system 10 for cooling (i.e., freezing) a ground food product using a cryogen is disclosed. A cooling unit 12 useful in the practice of the present invention includes an enclosure 14 which is in the form of an elongated substantially rectangular conduit. The enclosure 14 includes an inlet 16 and an outlet 18. The inlet and outlet 16 and 18 are formed in opposing ends of the enclosure 14. Inlet 16 and outlet 18 are dimensioned so that the pieces of ground food product being fed into the enclosure 14 can fit comfortably through both openings. The overall length of the enclosure is in a range from about 32 feet to 40 feet, and in one embodiment is 36 feet, and defines a cooling zone 20 between the inlet and outlet.

The cooling unit 12 further includes a substantially horizontal conveyor belt 22 to convey the ground food product from adjacent the inlet 16 of the enclosure, through the cooling zone 20 to the outlet 18. The conveyor belt 22 is of a material that can withstand subzero temperatures and is also provided in a web structure permitting circulation of cryogen there through. Suitable materials include metals, metal composites, and in one embodiment, stainless steel.

The cooling unit 12 also includes a motor and drive mechanism suitable for controllably rotating the conveyor about its axis. The overall width of the conveyor belt 22 and enclosure 14 is large enough such that about 3250 pounds to about 3750 pounds of ground food product can be frozen per hour by the system 10. Frozen ground product exiting outlet 18 can be stored, shipped, or otherwise handled or treated in accordance with the wishes of the user.

In one embodiment, the frozen ground product exiting outlet 18 is chopped into about 2 to about 4 inch pieces by a chopper 24 positioned adjacent the outlet 18 and fed by the conveyor belt 22. The chopper 24 in one embodiment is two identical cylinders 23 (only one shown for ease of illustration) each having a plurality of teeth 25 situated there around for breaking up the exiting frozen ground food product from the outlet 18 of the enclosure 14 therebetween. It is to be appreciated that the cylinders 23 of the chopper 24 are height adjustable relative to each other to ensure a suitable clearance therebetween, such that the exiting extruded and frozen ground food product does not jam therebetween. The system 10 also includes a motor and drive mechanism suitable for controllably rotating the chopper 24 about its axis.

In still another embodiment, a screw feeder 26 is positioned adjacent the chopper 24. The screw feeder 26 is used to gather and feed the extruded, frozen, and chopped, ground food product exiting the chopper 24, through a metal detector 28 to a dispensing unit 30 that fills shipping boxes 32. The inspected and filled boxes of the extruded, frozen, and chopped ground food product is then conveyed by a secondary conveyor 34 to a taping machine 36, and then handled thereafter in accordance with the wishes of the user.

Cryogen, such as liquid nitrogen or liquid air, is fed controllably through a control valve 37 into the interior of the enclosure from cryogen source 40, which will typically be a cylinder or other source of cryogen under pressure. Cryogen is fed from source 40 through lines 42 and dispensed out sprayers 44 at the ends thereof into the interior of the enclosure 14. To provide for a circular pattern of cryogen through and around the ground food product being conveyed on the conveyor belt 22, fans 46 are also provided in and along the length of the enclosure 14. The system 10 also includes motors and drive mechanisms suitable for controllably rotating the fans 46 about their axis.

Figure 2:
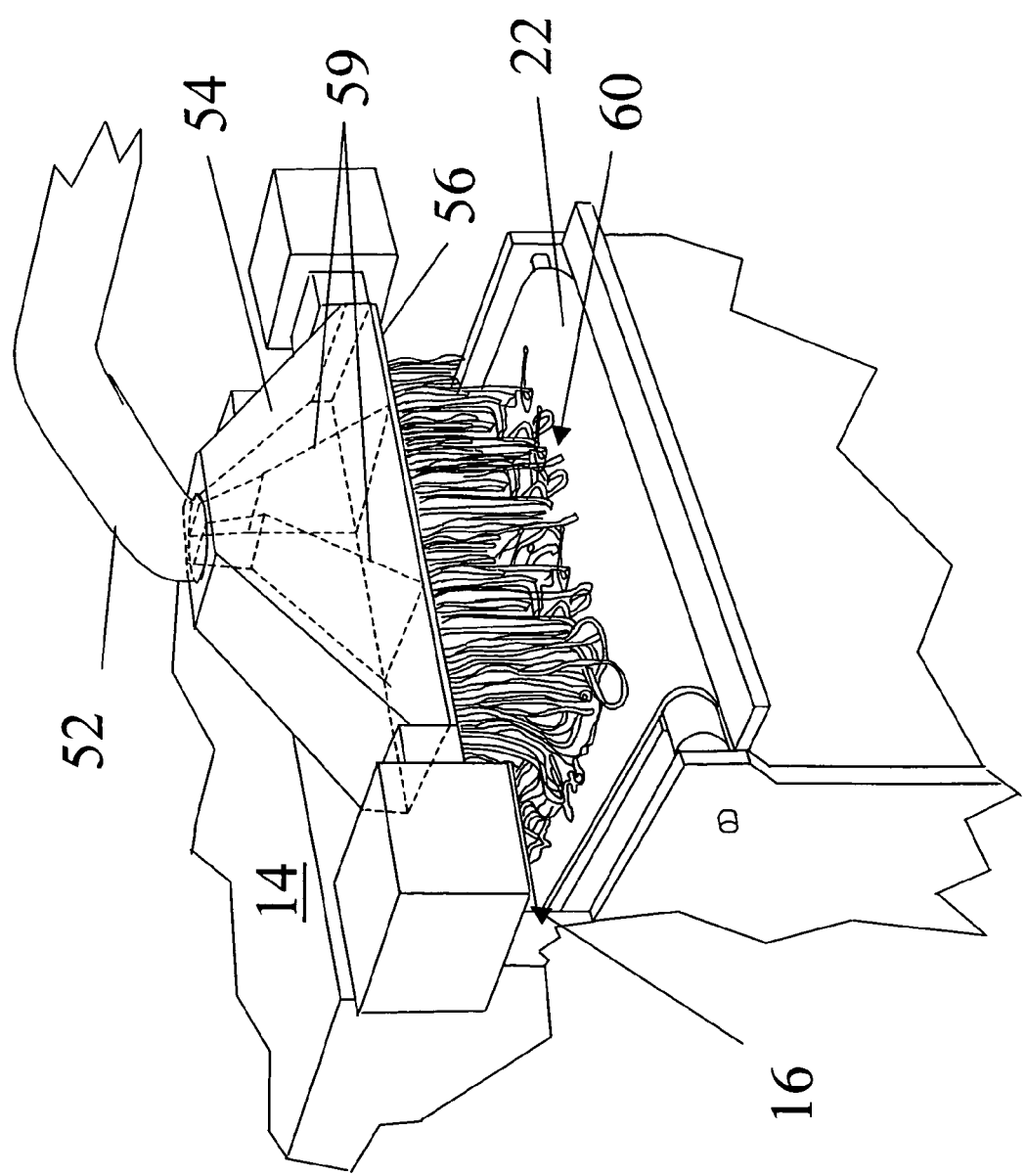
FIG. 2 is a perspective view, partially cut away, of a front end portion of the system of FIG. 1, showing a nozzle extruding a ground food product according to the present invention.
Figure 3A:
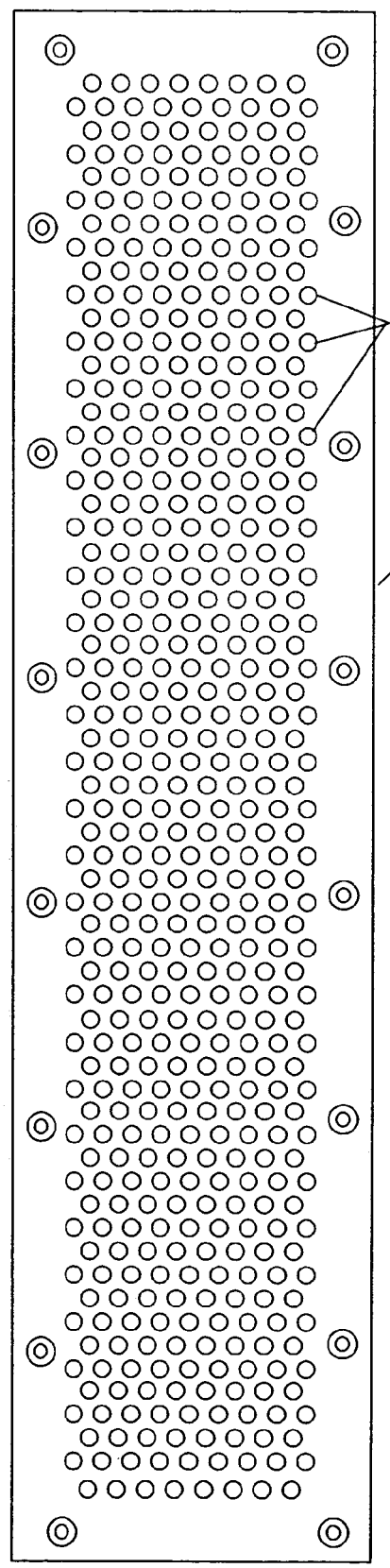
FIGS. 3A and 3B are top and bottom views of a shear plate of the nozzle depicted in FIG. 2 according to the present invention.

The system 10 also includes a feeder 48 for receiving a plurality of pieces of ground food product and feeding them continuously into the inlet 16 of the enclosure 14 onto the conveyor belt 22. The feeder 48 has a hopper 50 for holding a supply of the plurality of pieces for feeding, a feeding tube 52 providing the ground food product under pressure to a nozzle 54. The nozzle 54 has a head plate 56 with a plurality of holes 58 (best seen in FIG. 3A) through which the pieces of the ground food product are extruded as strands 60 onto the conveyor 22 as illustrated in FIG. 2. As best shown in FIG. 2, the nozzle 54 is provided with internal dividers 59 (shown by the hidden lines) to help separate and distribute the supply of ground food product from the feeder 48 more evenly across the surface area of the head plate 56 for extruding.

As shown in FIG. 2, the nozzle 54 is positioned adjacent the inlet 16 of the enclosure 14 directly above the conveyor belt 22. A movable shearing plate 62 (best shown in FIG. 3B) having a similar hole pattern as the head plate 54 is provided integral therewith to cut the extruded strands. In one embodiment, the head and shear plates 56 and 62 may have a hole pattern having in the range of about 600 to about 1200 holes each with a diameter in the range of about ¼ inch to about ¾ inch.

Figure 3B:
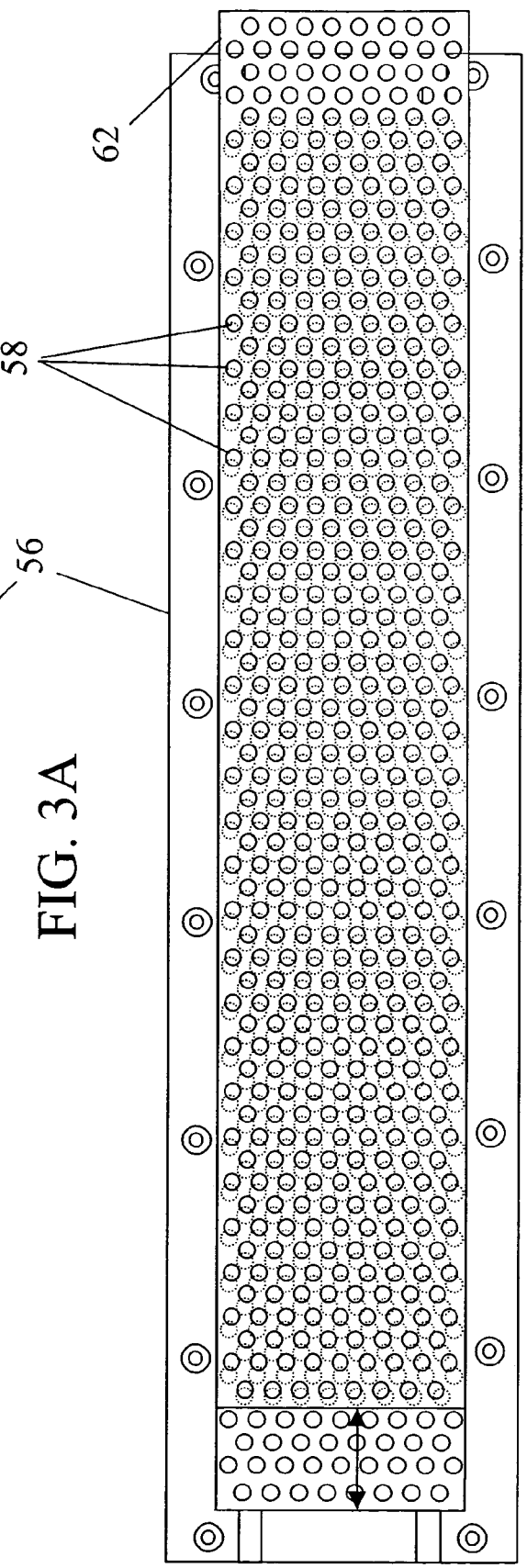

Turning back to FIG. 1, an actuator system 64 for moving the shearing plate 62 in a back and forth motion, as indicated by the double arrow in FIG. 3B, is also provided to the system 10. In one embodiment, the actuator system 64 is a hydraulic system having two single stoke cylinders 66 and 68 positioned at and engaging opposed ends of the shearing plate 62. In another embodiment, the cylinders 66 and 68 may be pneumatically driven by a conventional pneumatic actuator system. In one embodiment, the actuator system 62 is setup to stoke the cylinders 66 and 68 such that the strands 60 are cut by the shearing plate 62 in lengths ranging from about 8 inches to about 14 inches long.

In one embodiment, the system 10 is run manually wherein all components are setup and operated by operator intervention. In another embodiment, the system 10 may include a controller 70, preferably a small computer or other equivalent device, capable of receiving electrical signals generated by the feeder 48, and electrical signals corresponding to the rotation speed of the conveyor belt 22 and chopper 24, such as for example via an encoder, and the average temperature of the ground food product entering the inlet 16, as well as the temperature of the food product exiting the outlet 18 of the enclosure 14. Infrared sensors useful for this purpose, which detect heat and quantify it as an electrical signal proportional to the sensed temperature, are commercially available.

In one embodiment, the controller 70 is programmed, in any conventionally known manner, to generate from the above mentioned electrical signals and at least an input of a desired exit temperature of the ground food product, an output signal corresponding to the flow rate at which cryogen is to be supplied to the cooling zone 20 of the enclosure 14, the rotation speed of the conveyor belt 22 and chopper 24, and feed rate of feeder 48 so as to bring about the desired degree of temperature reduction of the food products passing through enclosure. Control of the conveyor belt, chopper, feeder, actuator, and combinations thereof, is exercised, for example, by electrical control of their respective motors. Control of cryogen flow is exercised by electrical control of valve 37 which adjusts the volume which is measured by pressure in the feed line 42 to correspond to the desired rate of flow of cryogen through line. The output signal is of course also a function of the temperature differential of the incoming and outgoing product, of the mass flow rate of the product passing through the nozzle, as well as a function of the temperature and the specific heat of vaporization of the cryogen applied via sprayers 44. These relationships may also be programmed into the controller 70.

In general, the desired exit temperature of extruded ground food product exiting outlet 18 is preferably about $-10°$ F. to about $15°$ F. The average temperature of the incoming product can vary widely. It can be measured manually and manually inputted to controller 70 or it can be measured automatically (e.g. electronically, such as by an infrared sensing eye as described above) which sends a corresponding signal to controller 70. The flow rate of the cryogen is from about 20 psi to about 26 psi. The temperature inside the enclosure 14 is generally as low as about $-200°$ F. to about $-300°$ F.

In one embodiment, where the ground food product is beef, the flow rate of the cryogen is about 22 psi, and system 10 is setup to run at a rate such that the temperature of the ground beef drops from about $30°$ F. to about $0°$ F. in about 90 seconds. In another embodiment, where the ground food product is turkey, the flow rate is about 25 psi, and the system 10 is setup to run at a rate such that the temperature of the ground turkey drops from about 35° F. to 0° F. in about 90 seconds.

Having described the present invention in detail and by reference to the embodiments thereof, it will be apparent that modifications and variations are possible without departing from the scope of the invention in the following claims.

What is claimed is:

1. A system for extruding, cutting into strands, freezing, and chopping a ground food product, comprising:
   a cooling unit comprising an enclosure and having an inlet and an outlet, a conveyor belt for continuously urging extruded and stranded pieces of the ground food product from said inlet through a cooling region in said enclosure and out of the outlet when the conveyor belt is rotating, and a cryogen source for feeding cryogen into said cooling region, wherein said cryogen source is adapted to dispense the cryogen at a flow rate sufficient to lower the temperature of the extruded and stranded pieces to a desired temperature at or below freezing when they exit the outlet of the enclosure;
   a feeder for receiving and feeding continuously the ground food product onto the conveyor belt adjacent said inlet of the enclosure, the feeder having a hopper for holding a supply of the ground food product and a nozzle having a plurality of holes through which the ground food product is extruded onto the conveyor belt, and a shearing plate provided to cut extruded pieces of the ground food product, while being extruded, into strands;
   an actuator system for moving the shearing plate in order to cut the extruded pieces of the ground food product; and
   a chopper provided adjacent the outlet of the enclosure and feed by said conveyor belt for chopping the extruded and stranded pieces of the food product after passing through the cooling region of the enclosure.

2. A system according to claim 1 further comprising a controller for monitoring and controlling the system.

3. A system according to claim 1 wherein said cryogen source includes lines which feeds cryogen into said cooling zone of said enclosure and a valve for controlling the flow rate of the cryogen in the lines.

4. A system according to claim 1 wherein said cryogen is selected from the group comprising liquid nitrogen and liquid air.

5. A system according to claim 1 wherein said cooling region includes fans for circulating the cryogen around the conveyor belt.

6. A system according to claim 1 wherein said nozzle includes a head plate having a hole pattern having in the range of about 600 to about 1200 holes each with a diameter in the range of about ¼ inch to about ¾ inch.

7. A system according to claim 1 wherein said nozzle includes a head plate having a hole pattern and internal dividers to help separate and distribute the supply of ground food product from the feeder more evenly across a surface area of said head plate for extruding.

8. A system according to claim 1 wherein said nozzle includes a head plate having a hole pattern and said shearing plate is provided with substantially the same hole pattern of said head plate.

9. A system according to claim 1 wherein said actuator is selected from the group comprising a hydraulic system and a pneumatic system.

10. A system according to claim 1 wherein said actuator includes a pair of stoke cylinders for moving the shearing plate.

11. A system according to claim 1 wherein said chopper comprises two identical cylinders each having a set of teeth, and said cylinders are height adjustable relative to each other.

12. A system according to claim 1 further comprising a screw feeder adjacent the chopper for receiving and moving the extruded and stranded pieces of the ground food product, after freezing and chopping, through a metal detector to a dispensing unit that fills shipping boxes with the pieces.

13. A continuous method for extruding, cutting into strands, freezing, and chopping a ground food product, comprising:
   providing a cooling unit comprising an enclosure and having an inlet and an outlet, a conveyor belt continuously urging extruded and stranded pieces of the ground food product from said inlet through a cooling region in said enclosure and out of the outlet, and a cryogen source feeding cryogen into said cooling region, wherein said cryogen source is dispensing the cryogen at a flow rate sufficient to lower the temperature of the extruded and stranded pieces to a desired temperature at or below freezing when exiting the outlet of the enclosure;
   providing a feeder receiving and feeding continuously the ground food product onto the conveyor belt adjacent said inlet of the enclosure, the feeder having a hopper holding a supply of the ground food product and a nozzle having a plurality of holes through which the ground food product is extruded onto the conveyor belt, and a shearing plate provided to cut extruded pieces of the ground food product, while being extruded, into strands;
   providing an actuator system moving the shearing plate in order to cut the extruded pieces of the ground food product; and
   providing a chopper provided adjacent the outlet of the enclosure and feed by said conveyor belt chopping the extruded and stranded pieces of the food product after passing through the cooling region of the enclosure.

14. A method according to claim 13 wherein the temperature of said food products exiting said outlet is about −10° F. to about 15° F.

15. A method according to claim 13 wherein said cryogen is selected from the group comprising liquid nitrogen and liquid air.

16. A method according to claim 13 wherein said flow rate of the cryogen is from about 20 psi to about 26 psi, and temperature inside the enclosure is generally as low as about −200° F. to about −300° F.

17. A method according to claim 13 wherein the ground food product is selected from the group comprising meat, fish, vegetables, fruit, and pastry products.

18. A method according to claim 13, wherein said feeder, said cooling unit, said actuator, and said chopper are setup to run at a rate such that the temperature of the food product drops to 0° F. in about 90 seconds from the inlet to the outlet, and about 3250 pounds to about 3750 pounds of ground food product is extruded, cut into strands, frozen, and chopped per hour.

19. A method according to claim 13, wherein the ground food product is ground turkey, the flow rate is about 25 psi, and said feeder, said cooling unit, said actuator, and said chopper are setup to run at a rate such that the temperature of the ground turkey drops from about 35° F. to 0° F. in about 90 seconds, and about 3250 pounds to about 3750 pounds of the ground turkey is extruded, cut into strands, frozen, and chopped per hour.

20. A method according to claim 13 wherein the ground food product is ground beef, the flow rate of the cryogen is about 22 psi, and said feeder, said cooling unit, said actuator, and said chopper are setup to run at a rate such that the temperature of the ground beef drops from about 30° F. to 0° F. in about 90 seconds, and about 3250 pounds to about 3750 pounds of the ground beef is extruded, cut into strands, frozen, and chopped per hour.

* * * * *